United States Patent
Rzeszewski et al.

(10) Patent No.: US 8,565,472 B2
(45) Date of Patent: Oct. 22, 2013

(54) METHOD, DEVICE AND SYSTEM FOR DYNAMICALLY EMBEDDING WATERMARK INFORMATION INTO MULTIMEDIA CONTENT

(75) Inventors: Theodore S. Rzeszewski, Wheaton, IL (US); Eiraj Rezania, Kildeer, IL (US)

(73) Assignee: General Instrument Corporation, Horsham, PA (US)

( * ) Notice: Subject to any disclaimer, the term of this patent is extended or adjusted under 35 U.S.C. 154(b) by 1090 days.

(21) Appl. No.: 11/927,975

(22) Filed: Oct. 30, 2007

(65) Prior Publication Data

US 2009/0110231 A1   Apr. 30, 2009

(51) Int. Cl.
*G06K 9/00* (2006.01)

(52) U.S. Cl.
USPC .......................................... 382/100; 713/176

(58) Field of Classification Search
USPC ............ 382/100, 232; 380/54, 210, 252, 287; 713/176; 704/200.1, 273; 348/460, 463
See application file for complete search history.

(56) References Cited

U.S. PATENT DOCUMENTS

| | | | |
|---|---|---|---|
| 6,037,984 A * | 3/2000 | Isnardi et al. | 375/240.21 |
| 6,185,312 B1 * | 2/2001 | Nakamura et al. | 382/100 |
| 6,208,745 B1 * | 3/2001 | Florencio et al. | 382/100 |
| 6,272,634 B1 * | 8/2001 | Tewfik et al. | 713/176 |
| 6,359,985 B1 * | 3/2002 | Koch et al. | 380/54 |
| 6,411,725 B1 * | 6/2002 | Rhoads | 382/100 |
| 6,523,113 B1 | 2/2003 | Wehrenberg | |
| 6,553,127 B1 * | 4/2003 | Kurowski | 382/100 |
| 6,621,933 B2 | 9/2003 | Chung et al. | |
| 6,683,957 B1 | 1/2004 | Shin | |
| 6,788,821 B2 | 9/2004 | Inoue et al. | |
| 7,006,568 B1 | 2/2006 | Gu et al. | |
| 7,103,104 B1 | 9/2006 | Bruls et al. | |
| 7,366,909 B2 | 4/2008 | Zhou et al. | |
| 7,627,135 B2 | 12/2009 | Sakazawa et al. | |
| 7,706,566 B2 | 4/2010 | Shi et al. | |

(Continued)

FOREIGN PATENT DOCUMENTS

| AT | EP0928110 A2 * | 7/1999 | ............... H04N 7/26 |
|---|---|---|---|
| EP | 0928110 A2 | 7/1999 | |

(Continued)

OTHER PUBLICATIONS

PCT Search Report & Written Opinion, RE: Application #PCT/US08/80059 Oct. 12, 2008.

(Continued)

*Primary Examiner* — Anand Bhatnagar
(74) *Attorney, Agent, or Firm* — Stewart M. Wiener

(57) ABSTRACT

A method and devices for dynamically embedding watermark and/or end-user access information into multimedia content. The method includes providing multimedia content transformed into blocks that each include an array of pixel blocks, and dynamically embedding portions of watermark and/or end-user access information into selected pixel blocks based on the values of the coefficients within the pixel blocks. For multimedia content encoded using discrete cosine transform (DCT) or other block-based encoding, the transform coefficients to include embedded information are chosen based on analysis of the coefficient values, rather than in a fixed or predetermined manner. Also, embedding watermark and/or end-user access information can occur across different pixel blocks within a given image to reduce the number of embedded coefficients per block, within the peripheral pixel blocks within a given image, and/or in different areas across images to reduce the duration of embedded information in any one area.

23 Claims, 5 Drawing Sheets

(56) References Cited

U.S. PATENT DOCUMENTS

| | | | |
|---|---|---|---|
| 2001/0005397 | A1 | 6/2001 | Watanabe |
| 2003/0016756 | A1 | 1/2003 | Steenhof et al. |
| 2003/0043922 | A1 | 3/2003 | Kalker et al. |
| 2004/0091050 | A1 | 5/2004 | Choi et al. |
| 2004/0228409 | A1 | 11/2004 | Ryou |
| 2005/0198686 | A1 | 9/2005 | Krause et al. |
| 2005/0276416 | A1 | 12/2005 | Zhu et al. |
| 2006/0020806 | A1 | 1/2006 | Yamashita et al. |
| 2006/0107056 | A1 | 5/2006 | Bhatt et al. |
| 2006/0133477 | A1 | 6/2006 | Zhang et al. |
| 2006/0184982 | A1 | 8/2006 | Paz et al. |
| 2007/0053438 | A1 | 3/2007 | Boyce et al. |
| 2007/0098162 | A1 | 5/2007 | Shin |
| 2007/0101147 | A1* | 5/2007 | Brunk et al. ............ 713/176 |
| 2009/0110059 | A1 | 4/2009 | Rzeszewski et al. |
| 2010/0177891 | A1 | 7/2010 | Keidar et al. |

FOREIGN PATENT DOCUMENTS

| | | | |
|---|---|---|---|
| EP | 0947953 | A2 | 10/1999 |
| KR | 10-2007-0045556 | | 5/2007 |
| WO | 99/60792 | A1 | 11/1999 |
| WO | 02/33650 | A1 | 4/2002 |

OTHER PUBLICATIONS

Office Action, Korean App. No. 10-2010-7011799 (Foreian Text and English Translation), Aug. 2, 2011.

Digital Watermarking Alliance, "Digital Watermarking: Enabling Digital Media Commerce in 2008 and Beyond", DWA Symposium at the Hollywood Roosevelt Hotel, Nov. 15, 2007.

Digital Cinema Initiatives, LLC, "Digital Cinema System Specification, V1.0", Jul. 20, 2005.

Digital Cinema Initiatives, LLC, "Digital Cinema System Specification, Version 1.1", Apr. 12, 2007.

Dom Stasi, "Studios' watermarking agenda could benefit cable . . . ", CEDMagazine.com, dated Sep. 1, 2007.

Reza Rassool, "Scaling Watermarking for IPTV and Beyond", National Association of Broadcasters (NAB) 2007, Las Vegas, NV, Apr. 18, 2007.

Reza Rassool, "Widevine's Mensor", Broadcast Engineering, Aug. 2007.

TVN Entertainment Corporation, "Widevine and TVN Join Forces to Deploy Forensic Tracking Technology to Video On Demand Content", Press Release, Nov. 8, 2005.

PCT International Search Report, Re: Application # PCT/US08/80926; Dec. 19, 2008.

Office Action, U.S. Appl. No. 11/930,297; Jun. 28, 2011.

Office Action, Korean App. No. 10-2010-7009708 (English Translation); Aug. 19, 2011.

EPC Extended Search Report, Re: Application #08843400.6-1906/2206273, PCT/US2008080059, Feb. 15, 2013.

Holliman, M. et al. "Adaptive Public Watermarking of DCT-based Compressed Images", Proceedings of SPIE, SPIE, vol. 3312, Jan. 28, 1998, pp. 284-295.

Lin, Eugene T., et al., "Advances in Digital Video Content Protection", Proceedings of the IEEE, vol. 93, No. 1, Jan. 2005.

Hartung, Frank, et al., "Digital Watermarking of MPEG-2 Coded Video in the Bitstream Domain", Proceedings International Conference on Acoustics, Speech and Signal Processing, vol. 4, Apr. 1997.

* cited by examiner

| 138 | 256 | 47 | 46 | 58 | 15 | 14 | 13 |
|-----|-----|-----|-----|-----|-----|-----|-----|
| 256 | 200 | 230 | 158 | 100 | 10 | 10 | 12 |
| 187 | 190 | 220 | 11 | 10 | 11 | 15 | 12 |
| 186 | 100 | 200 | 200 | 15 | 75 | 68 | 11 |
| 150 | 95 | 190 | 150 | 75 | 90 | 110 | 105 |
| 95 | 100 | 180 | 180 | 100 | 120 | 130 | 140 |
| 64 | 76 | 73 | 55 | 65 | 75 | 125 | 130 |
| 65 | 75 | 70 | 70 | 70 | 65 | 30 | 20 |

| 75 | 20 | 30 | 0 | 2 | 0 | 1 | 6 |
|-----|-----|-----|-----|-----|-----|-----|-----|
| 30 | 15 | 20 | 10 | 1 | 0 | 0 | 1 |
| 12 | 10 | 0 | 2 | 1 | 0 | 1 | 0 |
| 5 | 6 | 0 | 2 | 0 | 3 | 0 | 0 |
| 0 | 2 | 0 | 0 | 0 | 0 | 1 | 2 |
| 0 | 0 | 0 | 0 | 1 | 1 | 1 | 0 |
| 2 | 3 | 4 | 0 | 0 | 1 | 1 | 0 |
| 0 | 0 | 0 | 1 | 0 | 1 | 1 | 0 |

METHOD, DEVICE AND SYSTEM FOR DYNAMICALLY EMBEDDING WATERMARK INFORMATION INTO MULTIMEDIA CONTENT

BACKGROUND OF THE INVENTION

1. Field of the Invention

The invention relates to digital watermarking and watermark information and end-user access information. More particularly, the invention relates to embedding watermarking information or end-user access information into multimedia content.

2. Description of the Related Art

Watermarks are used generally to identify the origin and/or ownership of an image or other underlying content. For example, conventional watermarks can include information that identifies the owner or author of the content and/or unique product information related to the content purchase. When used with multimedia content and other digital media, such as digital video or image content, watermarks include watermark information that can be embedded into the multimedia content in a manner that makes the watermark effectively invisible or nondiscernable to the end user of the digital media, e.g., as the underlying multimedia content into which the watermark was embedded is played on, displayed on or otherwise processed or consumed by the end user device. Also, when used with multimedia content and other digital media, watermarks typically are embedded into the multimedia content in such a way that the removal or attempted removal of the watermark may destroy or visibly alter the underlying multimedia content. Alternatively, the watermark can be visible to end users and removable by authorized end users or end user devices having access to an appropriate decoder, while not being removable by unauthorized end users or end user devices. Watermarking in multimedia content and other digital media also can identify tampering, since manipulation of watermark data often can result in an invalid watermark.

End-user access information generally is any suitable information that allows (or denies) end users and/or end user devices to access and/or control associated multimedia content. For example, end-user access information can include, but is not limited to, digital rights management (DRM) information, such as security and/or control keys and/or messages, encryption and/or decryption keys, digital signature and certificate information, end user authentication information, and/or any other DRM information that allows (or denies) end user access to multimedia content, including access information in accordance with one or more DRM standards, such as the Open Mobile Alliance (OMA) standard and one or more of the Digital Video Broadcasting (DVB) standards, including DVB-H for handheld or mobile end user devices. End users access information also can include, but is not limited to, conditional access (CA) information (CAI), such as one or more scrambler, descrambler and/or control keys and/or messages, encryption and decryption control keys and/or words, entitlement control and/or entitlement management information, and/or any other access information used within a conditional access system to protect content and/or allow access to and/or control of protected content by one or more end users, including access information in accordance with one or more conditional access system standards, such as Digital Video Broadcasting-Conditional Access (DVB-CA).

Multimedia content often is coded and transmitted using a block-based video compression encoder, such as an MPEG (Moving Pictures Experts Group) encoder, which formats the stream of multimedia content according to a suitable standard, such as the MPEG-2 or MPEG-4 standard, or other suitable standard. Using block-based encoding, each frame of the multimedia content typically is encoded as a plurality of coded blocks using a discrete cosine transform (DCT) or other suitable transform, which, in general, transforms each block of content from the spatial domain to the frequency domain. In general, each coded block is represented by a plurality or matrix of coefficients, such as DCT coefficients.

Conventional watermarking methods, such as for use in watermarking digital images, include dividing watermark images into blocks and encoding the blocks using an appropriate transform. That is, the watermark image can be treated as an image and coded using a suitable image coding technique. The encoded watermark image then is added to or combined with an encoded version of content images to form a combined, encoded image. For example, coefficients representing the coded watermark image can be added to, inserted in or replace coefficients representing the coded content. Such conventional methods insert or replace watermark information in a fixed or predetermined manner, such as according to a given algorithm.

Although conventional watermarking methods of this kind attempt to reduce the amount of distortion introduced to the content as a result of the embedded watermark, there typically is at least some amount of distortion to the underlying content. Depending on the degree of the distortion to the content, the viewing experience of such content can be diminished. Alternatively, to reduce the existing amount of distortion to the content, some conventional watermarking methods eliminate or distort the watermark itself, e.g., by reducing the number of coefficients that represent the watermark image.

BRIEF DESCRIPTION OF THE DRAWINGS

FIG. 4 is a diagram of a matrix of coefficients representing a coded block of multimedia content;

FIG. 5 is a diagram of a typical matrix of coefficients after quantization;

DETAILED DESCRIPTION

Figure 1:
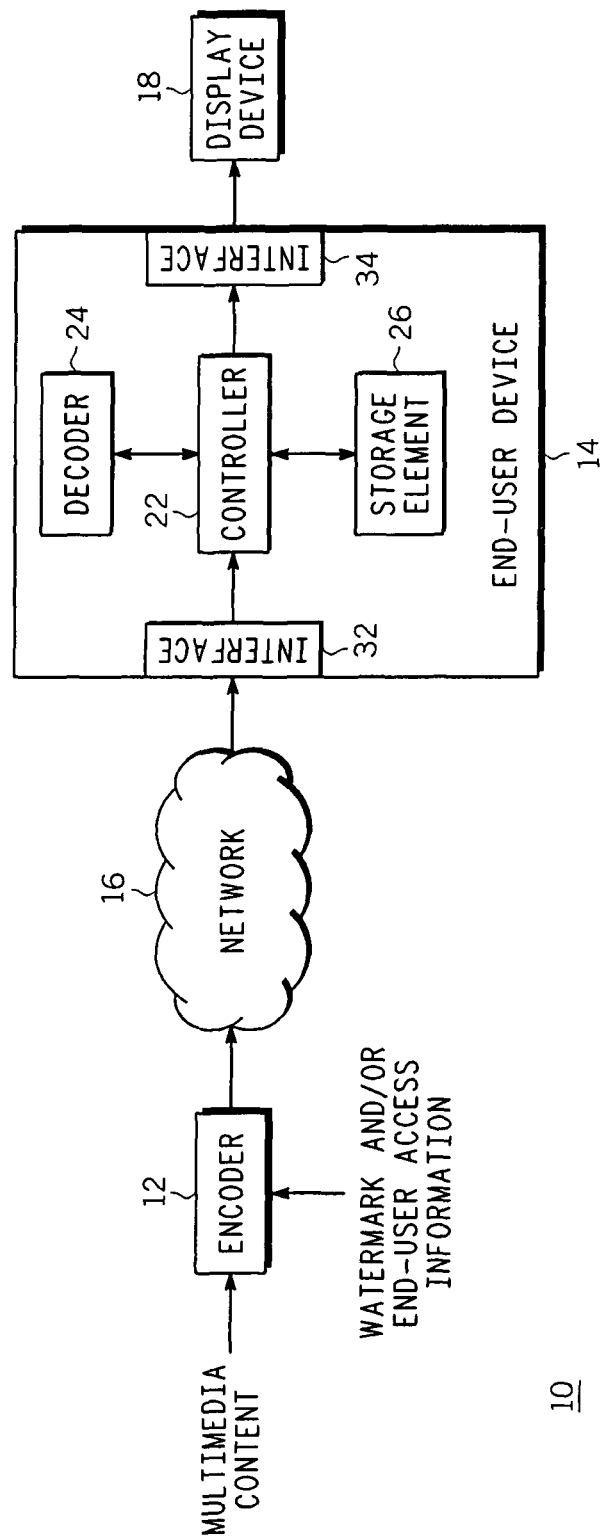
FIG. 1 is a block diagram of a system for embedding watermarking information or end-user access information into multimedia content, such as multimedia content transmitted to end user devices.

In the following description, like reference numerals indicate like components to enhance the understanding of the system, method and devices for embedding watermark information into multimedia content through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

The methods, systems and devices described herein involve dynamically embedding watermark information or end-user access information into multimedia content in a manner that reduces distortion of the multimedia content by the embedded information and reduces visibility of the embedded information in the multimedia content. For example, different portions of the watermark information or end-user access information are embedded across a number of different pixel blocks within a given image, e.g., within the transform coefficients of the various pixel blocks in the image. In this manner, a reduced number of transform coefficients per image are used for watermark information or end-user access information, thus reducing distortion by the embedded information of the image represented by the pixel blocks compared to conventional encoding/embedding methods. Alternatively, watermark information or end-user access information is embedded into peripheral pixel blocks within a given image, e.g., within the transform coefficients of peripheral pixel blocks. In this manner, watermark information or end-user access information is embedded within pixel block areas of the image that are not viewed as intently or focused upon as much as other areas of the image, such as the central area or center of the image. Also, alternatively, watermark information or end-user access information is dynamically embedded into different respective pixel block areas across the image to reduce the duration of a embedded information in any one area of the multimedia content image, thus reducing or limiting the duration of any distortion of the multimedia content image caused by the embedded information. The pixel block areas selected to include watermark information or end-user access information embedded therein are chosen dynamically, e.g., based on actual analysis of the coefficient values, rather than in a fixed or predetermined manner, such as according to an algorithm. The embedding methods and devices are useful with multimedia content encoded using block-based encoders and encoding methods, such as discrete cosine transform (DCT) encoding.

Referring now to FIG. 1, shown is a block diagram of a conventional system 10 for dynamically embedding watermark information and/or end-user access information into multimedia content, e.g., multimedia content transmitted to one or more end user devices. The system 10 includes a multimedia content provider/server (not shown) for providing multimedia content, a watermark information and/or end-user access information provider (not shown) for generating or providing watermark information and/or end-user access information, an encoder 12 for embedding watermark information and/or end-user access information into multimedia content, and one or more end user devices 14 configured to receive multimedia content, including multimedia content having watermark information and/or end-user access information embedded therein. The end user devices 14 can be coupled to the multimedia content providers via one or more networks 16, such as an Internet protocol (IP) network or wireless network.

Multimedia content, including multimedia content having watermark information and/or end-user access information embedded therein, can be provided by any suitable transmission source of multimedia content, such as over-the-air broadcasters, from a cable television plant, satellite or terrestrial broadcast station or other multimedia service provider. Multimedia content, watermark information and end-user access information can be provided by the same source or provider, although such is not necessary. The multimedia content can be any suitable multimedia content, such as broadcast video, including movies, programming events and/or other multimedia content that is distributed, e.g., as one or more programming streams from a broadcast source or other suitable multimedia content source. The multimedia content typically is a plurality of digital signals formatted according to a suitable standard, such as the MPEG-2 (Moving Picture Experts Group) or MPEG-4 standard, and multiplexed into a data stream that is modulated on a carrier using quadrature amplitude modulation (QAM) or other suitable modulation technique.

Watermark information includes, but is not limited to, any information that can be used to identify the origin and/or ownership of its underlying content, e.g., the multimedia content in which the watermark information is embedded. Watermark information can be generated or provided in any suitable manner, such as by the multimedia content provider or by the original creator of the underlying multimedia content. When used with multimedia content and other digital media, watermark information typically is one or more watermark codes represented by one or more streams of digital information or digital signals. Also, for purposes of discussion herein, watermark information can be and/or include any suitable information that allows (or denies) end users and/or end user devices to access and/or control associated multimedia content, such as digital rights management (DRM) information and/or conditional access (CA) information (CAI).

When used with multimedia content and other digital media, watermarks include watermark information and/or one or more watermark codes that typically are embedded into the multimedia content in a manner that makes the watermark effectively invisible or nondiscernable to the end user of the digital media, e.g., as the underlying multimedia content into which the watermark was embedded is played on, displayed on or otherwise processed or consumed by the end user device. As will be discussed in greater detail hereinbelow, upon receipt of multimedia content having watermark information embedded therein, the end user device typically is equipped to read out and/or extract the watermark information from the underlying multimedia content. The extracted watermark information can be used for a number of purposes, e.g., to compare with a watermark reference to identify the origin of the underlying multimedia content. End-user access information can be used to authenticate an end user for accessing the underlying multimedia content.

The encoder 12 can be part of any suitable multimedia encoder or video encoder, which can be part of the multimedia content provider. As discussed hereinabove, multimedia content often is coded and transmitted using a block-based video compression encoder, such as an MPEG encoder. Accordingly, the encoder 12 can be part of an MPEG encoder or other multimedia content encoder, although such is not necessary. Also, alternatively, the encoder 12 can be external to the multimedia content service provider. In the system 10, the encoder 12 is configured to receive multimedia content, watermark information and end-user access information, and to embed or otherwise incorporate watermark information and/or end-user access information into multimedia content, e.g., in the manner discussed hereinbelow.

The network 16 can be any communication network or network server arrangement suitable for transmitting multimedia content, including multimedia content having watermark information and/or end-user access information embedded therein, to one or more of the end user devices 14. For example, the network 16 can be or include the Internet or an Internet protocol (IP) based network, or other suitable public network. The network 16 also can include a computer network, a web-based network or other suitable wired or wireless network or network system. Also, the network 16 can be or include any suitable wired or wireless network system, wired or wireless wide area network (WAN), local area network (LAN) or wireless local area network (WLAN), such as a residential network, or other suitable network or network system.

The end user device 14 can be any device suitable for receiving, viewing, storing, executing, consuming and/or otherwise processing multimedia content, watermark information and/or end-user access information. For example, the end user device 14 can be any digital video recorder (DVR) or digital video server (DVS) device, including any signal converter or decoder (set-top) box with internal and/or external recording capabilities and local and/or remote storage, which often are referred to as personal video recorder (PVR) devices. Other suitable end user devices include a residential gateway, a home media server system, a digital video disk recorder, a computer, a television with built-in or added-on multimedia content receiving and/or storing capability, or other suitable computing devices and video processing devices, including internet protocol (IP), satellite and cable digital video recorders, and home area network (HAN) devices and systems. Also, the end user device 14 can be any suitable mobile or handheld end user device. For example, the end user device 14 can be a cellular telephone, a smart phone, a personal digital assistant (PDA), a digital music player and/or other handheld mobile device. Also, the end user device 14 can be a laptop personal computer (PC), a notebook PC and/or other mobile computing device with communications capability.

The end user device 14 can be partially or completely any suitable device or subsystem (or portion thereof) for receiving multimedia content from the content source, processing or decoding the received multimedia content, and transmitting or transferring the processed multimedia content to an end user display device 18, such as a television, a computer monitor or other suitable display device. Although the display device 18 is shown as a separate component from the end user device 14, the display device 18 and the end user device 14 can be combined or integrated as a single component.

Also, the end user device 14 can be any suitable device that can connect, communicate and exchange multimedia content with the network 16 or a network device. The connection between the network 16 and the end user device 14 can be a wired connection, such as a broadcast channel. Alternatively, the connection between the network 16 and the end user device 14 can be wireless. Although not shown, the network 16 typically includes one or more devices, such as routers and/or computers, for establishing a wired or wireless connection with the end user device 14.

The end user device 14 includes a controller or processor 22 and a decoder 24 coupled to the controller 22. The end user device 14 also can include an optional content storage element 26 coupled to the controller 22. In general, the controller 22 processes multimedia content and other information received by the end user device 14. In addition to the content storage element 26, the end user device 14 can include at least one type of memory or memory unit (not shown) within the controller 22 and/or a storage unit or data storage unit coupled to the controller for storing processing instructions and/or information received and/or created by the end user device 14. The decoder 24 typically decodes or decompresses the multimedia content to make it suitable for display, e.g., by the end user display device 18.

The end user device 14 also can include one or more input and/or output interfaces for receiving and/or transmitting multimedia content, including multimedia content embedded with watermark information and/or end-user access information. For example, the controller 22 and other components in the end user device 14 can be coupled between a first or input interface 32, which receives multimedia content, including multimedia content embedded with watermark information and/or end-user access information, and a second or output interface 34, which transfers processed multimedia content, including stored multimedia content, to the end user display device 18. It should be understood that one or more of the interfaces 32, 34 can be a single input/output interface coupled to the controller 22. Also, it should be understood that one or more of the interfaces 32, 34 can be an interface configured to support more than one content source and/or more than one display device.

One or more of the controller 22, the decoder 24, the content storage element 26 and the interfaces 32, 34 can be comprised partially or completely of any suitable structure or arrangement, e.g., one or more integrated circuits. Also, it should be understood that the end user device 14 includes other components, hardware and software (not shown) that are used for the operation of other features and functions of the end user device 14 not specifically described herein.

The end user device 14 can be partially or completely configured in the form of hardware circuitry and/or other hardware components within a larger device or group of components. Alternatively, the end user device 14 can be partially or completely configured in the form of software, e.g., as processing instructions and/or one or more sets of logic or computer code. In such configuration, the logic or processing instructions typically are stored in a data storage device, e.g., the content storage element 26 or other suitable data storage device (not shown). The data storage device typically is coupled to a processor or controller, e.g., the controller 22. The controller accesses the necessary instructions from the data storage element and executes the instructions or transfers the instructions to the appropriate location within the end user device 14.

With respect to the content storage element 26, multimedia content processing devices typically include or have access to a hard drive or other storage element for recording streams of multimedia content, such as video streams broadcast from the multimedia content source. However, the content storage element 26 can be any suitable information storage unit, such as any suitable magnetic storage or optical storage device, including magnetic disk drives, magnetic disks, optical drives, optical disks, and memory devices, including random access memory (RAM) devices and flash memory. Also, although the content storage element 26 is shown within the end user device 14, the content storage element 26 can be located external to the end user device 14 and suitably coupled thereto.

Multimedia content, including multimedia content having watermark information and/or end-user access information embedded therein, can be transmitted or otherwise provided to one or more end user device 14, via the network 16, using any suitable connection or connections, e.g., one or more coaxial cables and/or optical fibers, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL). Also, multimedia content, including multimedia content having watermark information and/or end-user access information embedded therein, can be provided wirelessly, e.g., via over-the-air-broadcast from a satellite service provider or other suitable multimedia content service provider. Some end user devices, such as home computers and computer-related devices, can receive multimedia content via a computer network, either through a wired connection or wirelessly. Other devices, such as mobile or handheld end user devices, including personal digital assistants (PDAs) and cellular telephones, can receive multimedia content wirelessly, via a wireless network. To receive multimedia content, including multimedia content having watermark information and/or end-user access information embedded therein, one or more end user devices 14 may include one or more receiving components (not shown), such as a radio frequency (RF) tuner, a QAM demodulator, an MPEG stream demultiplexor, and a watermark information and/or end-user access information decryptor or decrypting module.

Figure 2:
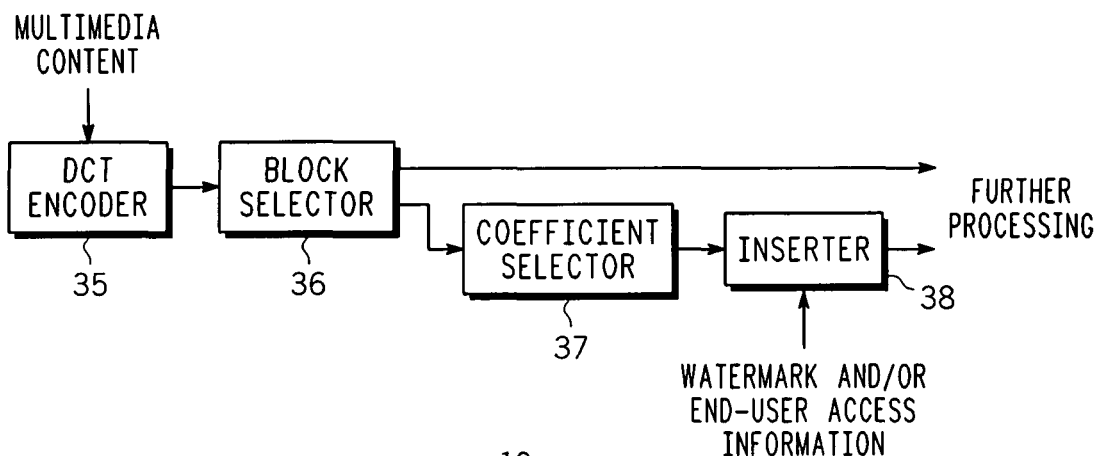
FIG. 2 is a block diagram of the encoder used in the system for embedding watermarking or end-user access information into multimedia content of FIG. 1.

Referring now to FIG. 2, shown is a block diagram of the encoder 12 used in the system 10 for dynamically embedding watermark information and/or end-user access information into multimedia content transmitted to end user devices. The encoder 12 includes a multimedia content encoder 35, such as a discrete cosine transform (DCT) encoder, a block selector 36, a coefficient selector 37, and a watermark information and/or end-user access information inserter 38. The operation of the encoder 12 will be discussed hereinbelow as part of the discussion of a method for embedding watermark information and/or end-user access information into multimedia content.

It should be understood that one or more of the components in the encoder 12, including one or more of the multimedia content encoder 35, the block selector 36, the coefficient selector 37 and the inserter 38, can be comprised partially or completely of any suitable structure or arrangement, e.g., one or more integrated circuits. Also, it should be understood that the encoder 12 includes other components, hardware and software (not shown) that are used for the operation of other features and functions of the encoder 12 not specifically described herein.

The encoder 12 can be partially or completely configured in the form of hardware circuitry and/or other hardware components within a larger device or group of components. Alternatively, the encoder 12 can be partially or completely configured in the form of software, e.g., as processing instructions and/or one or more sets of logic or computer code. In such configuration, the logic or processing instructions typically are stored in a data storage device (not shown). The data storage device typically is coupled to a processor or controller (not shown), which accesses the necessary instructions from the data storage element and executes the instructions or transfers the instructions to the appropriate location within the encoder 12.

Figure 3:
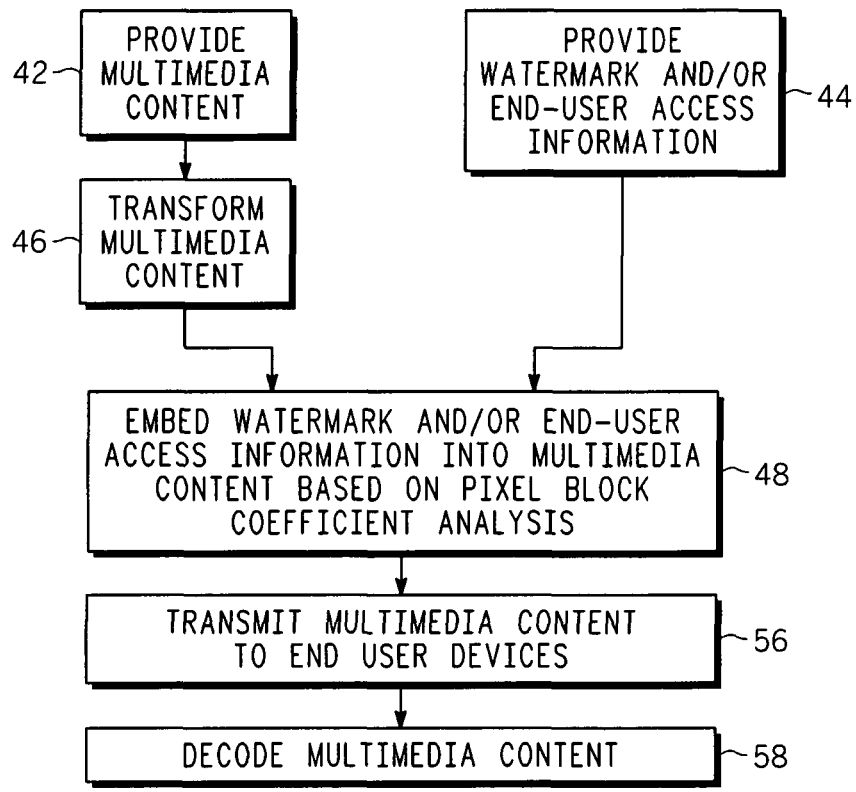
FIG. 3 is a block diagram of a method for embedding watermark information or end-user access information into multimedia content.

Referring now to FIG. 3, with continuing reference to FIG. 1 and FIG. 2, shown is a flow chart that schematically illustrates a method 40 for dynamically embedding watermark information and/or end-user access information into multimedia content, e.g., multimedia content for transmitting to one or more end user devices 14. The method 40 includes a step 42 of providing multimedia content and a step 44 of providing watermark information and/or end-user access information. As discussed hereinabove, multimedia content, watermark information and/or end-user access information can be provided by any suitable transmission source of multimedia content, such as a cable television plant, satellite or terrestrial broadcast station or other suitable multimedia service provider. Also, watermark information and/or end-user access information can be provided in any suitable manner, such as by the multimedia content provider or by the original creator of the underlying multimedia content.

The method 40 includes a step 46 of transforming multimedia content. As discussed generally hereinabove, multimedia content often is coded and transmitted using a block-based video compression encoder, such as an MPEG encoder. Before such encoding occurs, one or more domain transformations are performed on the multimedia content. For example, many domain transformation techniques use frequency domain transformation rather than spatial domain transformation, generally because applying a frequency domain transformation makes it possible to observe certain characteristics of the content that simplifies the manipulation of the information.

Once the multimedia content has been transformed, e.g., using a frequency domain transformation, block-based encoding, such as MPEG encoding, begins. Using block-based encoding, multimedia content is formatted as a series of images, with each image having a horizontal (width) dimension and a vertical (height) dimension defined by the number of pixels in the image. Block-based coding typically divides or codes each image into a matrix of pixel blocks, with each pixel block containing an array or matrix of pixels, e.g., an 8×8 array of pixels.

The method 40 includes a step 48 of embedding watermark information and/or end-user access information into the multimedia content, e.g., using the encoder 12. Using block-based encoding, the image frames of the multimedia content typically are encoded as pixel blocks using a discrete cosine transform (DCT) or other suitable transform, which, in general, transforms each pixel block of content from the spatial domain to the spatial frequency domain. In general, each coded pixel block is represented by a plurality or matrix of coefficients, such as DCT coefficients.

Referring now to FIG. 4, shown is a diagram 50 of a matrix of coefficients representing a coded block of multimedia content. The matrix of DCT coefficients represents the DC (zero frequency) component and a number of AC components of the pixel block. For example, for a typical 8×8 pixel block, the discrete cosine transformed signal typically includes an 8×8 array of DCT coefficients that represent the frequency components of the pixel information, e.g., 1 DC value for the entire block and 63 AC components of pixels.

For multimedia content that is processed using a discrete cosine transform or other suitable transform, the step 48 of embedding watermark information and/or end-user access information into the multimedia content can involve inserting watermark information and/or end-user access information into a portion of one or more of the transform coefficients (e.g., the DCT coefficients), or completely replacing one or more coefficients with watermark information and/or end-user access information. However, it should be understood that other suitable techniques for embedding watermark information and/or end-user access information into multimedia content can be included as part of the embedding step 48.

Typically, DCT coefficients each have 8 or 16 bits of information. Thus, the amount of watermark information and/or end-user access information that is to be embedded in the multimedia content will affect how many DCT coefficients are modified or replaced with watermark information and/or end-user access information. Typically, the number of DCT coefficients that are replaced with watermark information and/or end-user access information is below that which would visibly affect the underlying multimedia content. Also, as discussed hereinabove, modifying or replacing the higher order or least significant DCT coefficients, i.e., the DCT coefficients that contribute the least to the overall image of the multimedia content, allows more DCT coefficients to be modified or replaced while still reducing the overall effect of modifying or replacing DCT coefficients on the overall multimedia content image. The higher order or least significant DCT coefficients tend to be represented within the DCT coefficient matrix generally in the lower, right-hand corner.

As will be discussed in greater detail hereinabove, unlike conventional embedding steps, the embedding step 48 involves and is based on the reading and analysis of at least a portion of the DCT coefficient values within the pixel blocks. As discussed previously herein, conventional embedding methods usually insert watermark information and/or end-user access information into coefficients in a fixed or predetermined manner. That is, specific blocks are selected in a predetermined manner and specific coefficients within those selected blocks are selected in a predetermined manner to include watermark information and/or end-user access information therein. Such conventional methods do not read or evaluate the coefficient values and do not insert watermark information and/or end-user access information based on such evaluations. Moreover, such conventional methods do not dynamically select different blocks and/or different coefficient areas for embedding watermark information and/or end-user access information therein.

Referring again to FIG. 2, with continuing reference to FIG. 3 and FIG. 4, using the encoder 12, the embedding step 48 is described hereinbelow. Multimedia content received by the encoder 12 is received by an encoding element, such as the DCT encoder 35. It should be understood that other suitable encoding elements for encoding multimedia content can be used instead of a DCT encoder. As discussed hereinabove, the DCT encoder 35 (or other suitable encoding element) typically transforms the multimedia content into a plurality of images, each containing a matrix of pixel blocks.

The DCT encoder 35 then quantizes the transformed blocks of multimedia content by mapping each pixel block in the matrix to a discrete number. Each integer in the range of numbers used in the mapping symbolizes a color or luminance. With DCT quantization, the pixel blocks are encoded individually.

Referring now to FIG. 5, shown is a diagram 52 of the matrix of coefficients similar to those in FIG. 4 that might represent a typical video image. As can be seen, in general, the DCT coefficient values in the upper left corner are greater than the DCT coefficients in the lower right corner. After quantization, the plurality of blocks pass from the encoder 35 to the block selector 36.

Referring again to FIG. 2, the block selector 36 selects which of the blocks are to be embedded with watermark information and/or end-user access information. Blocks that are not selected to be embedded with watermark information and/or end-user access information can be passed directly to further processing. Blocks that are selected to be embedded with watermark information and/or end-user access information are passed to the coefficient selector 37. Alternatively, selected blocks and/or blocks not selected can be marked accordingly and all blocks can be passed through to the coefficient selector 37. In such case, the coefficient selector 37 is configured to identify which blocks have been selected for embedding with watermark information and/or end-user access information and which blocks were not selected for embedding with watermark information and/or end-user access information.

The block selector 36 can dynamically select which blocks are to be embedded with watermark information and/or end-user access information in any suitable manner. According to the embedding step 48, the block selector 36 typically selects blocks dynamically based on information within the blocks themselves, e.g., the values of the quantized pixel coefficients. Alternatively, such basis can be supplemented by other block selection criteria, such as making sure a percentage of the total number of blocks are selected.

Because block selection is dynamic (i.e., the same blocks in a given set of blocks are not always selected), the selected blocks should be marked, flagged or otherwise identified in a manner suitable for the coefficient selector 37 to determine which blocks have been selected for embedding with watermark information and/or end-user access information. Alternatively, the block selector 36 can notify the coefficient selector 37 which blocks have been selected for embedding without marking or flagging the selected blocks, e.g., by providing control information and/or other information to the coefficient selector 37.

For example, a flag or other indicia (e.g., a digital quantity of 11111111 for an 8-bit coefficient) can be inserted in a particular coefficient (e.g., the 63rd coefficient) to indicate that the particular block has been selected for embedding watermark information and/or end-user access information therein. Alternatively, the presence of a flag or other indicia, such as a digital quantity of 11111111, in any of the coefficients within the block may be suitable for indicating that the particular block has been selected for embedding watermark information and/or end-user access information therein.

The coefficient selector 37 is configured to select which of the coefficients within the selected blocks are to be embedded with watermark information and/or end-user access information. The number of coefficients per block and which coefficients within a given block are to be selected for embedding with watermark information and/or end-user access information are based on the value of one or more coefficients within a given block. For example, coefficients that have relatively low values and/or are next to or near coefficients that have relatively low values can be selected for embedding with watermark information and/or end-user access information.

Once the coefficients for embedding watermark information and/or end-user access information therein have been selected, the coefficient selector 37 can identify the coefficients selected for embedding in any suitable manner. For example, the coefficient selector 37 can provide suitable control information (e.g., to the inserter 38) that identifies which coefficients have been selected for embedding with watermark information and/or end-user access information. For example, the coefficient selector 37 can indicate to the inserter 38 that, for every block selected for embedding watermark information and/or end-user access information therein (e.g., for every block that has a digital quantity of 11111111 in the 63rd coefficient), a particular range of coefficients (e.g., coefficients 40-50) always contains watermark information and/or end-user access information.

Alternatively, the coefficient selector 37 can indicate to the inserter 38 that, for every block selected for embedding watermark information and/or end-user access information therein, a first particular coefficient (e.g., coefficient 62) indicates the first or leading coefficient in a range of coefficients containing watermark information and/or end-user access information (e.g., coefficient 43) and a second particular coefficient (e.g., coefficient 61) indicates the last or trailing coefficient in a range of coefficients containing watermark information and/or end-user access information (e.g., coefficient 51). That is, in this example, coefficients 62 and 61 indicate that watermark information and/or end-user access information is to be embedded in coefficients 43 through 51. It should be understood that coefficients selected for embedding watermark information and/or end-user access information therein can be selected dynamically in other appropriate manners.

Once the coefficient selector 37 selects which coefficients are to be embedded with watermark information and/or end-user access information, the plurality of blocks pass from the coefficient selector 37 to the inserter 38. The inserter 38 is configured to embed the selected coefficients within the selected blocks with watermark information and/or end-user access information. The inserter 38 can insert watermark information and/or end-user access information into the selected coefficients in any suitable manner. For example, the inserter 38 can completely replace selected coefficients with watermark information and/or end-user access information. Such embedding may include an intermediate step of first zeroing out the selected coefficient, followed by replacing the zeroed out coefficient with watermark information and/or end-user access information.

Alternatively, the inserter 38 can partially replace the selected coefficients with watermark information and/or end-user access information. For example, the inserter 38 can replace only a portion of the coefficient with watermark information and/or end-user access information. For example, if a coefficient is made up of 8 or 16 bits, the inserter 38 may replace only the 4 least significant bits with watermark information and/or end-user access information. Compared to completely replacing coefficients with watermark information and/or end-user access information, partially replacing coefficients with watermark information and/or end-user access information further reduces the overall effect that embedded information has on the quality of the underlying multimedia content.

Depending on the amount of watermark information and/or end-user access information embedded into the coefficients and the manner in which the watermark information and/or end-user access information is embedded into the selected coefficients within selected blocks, the embedded information can be divided among a plurality of coefficients within a given block, among the same coefficients across a plurality of blocks and/or among a plurality of different coefficients across a plurality of blocks. Such embedding of watermark information and/or end-user access information typically involves some sort of concatenation of the extracted watermark at the decoding end of the overall multimedia content transmission process.

Once the inserter 38 has inserted watermark information and/or end-user access information into the selected coefficients within the selected blocks, the blocks are passed on to further processing. This may include initially recombining the blocks selected by the block selector 36 with the blocks that were not selected by the block selector 36 before passing the blocks on to further processing. With respect to further processing, it should be understood that the encoder 12 can include other processing components, hardware and software (not shown) that are used for the operation of other features and functions of the encoder 12 not specifically described herein.

Figures 6, 7:
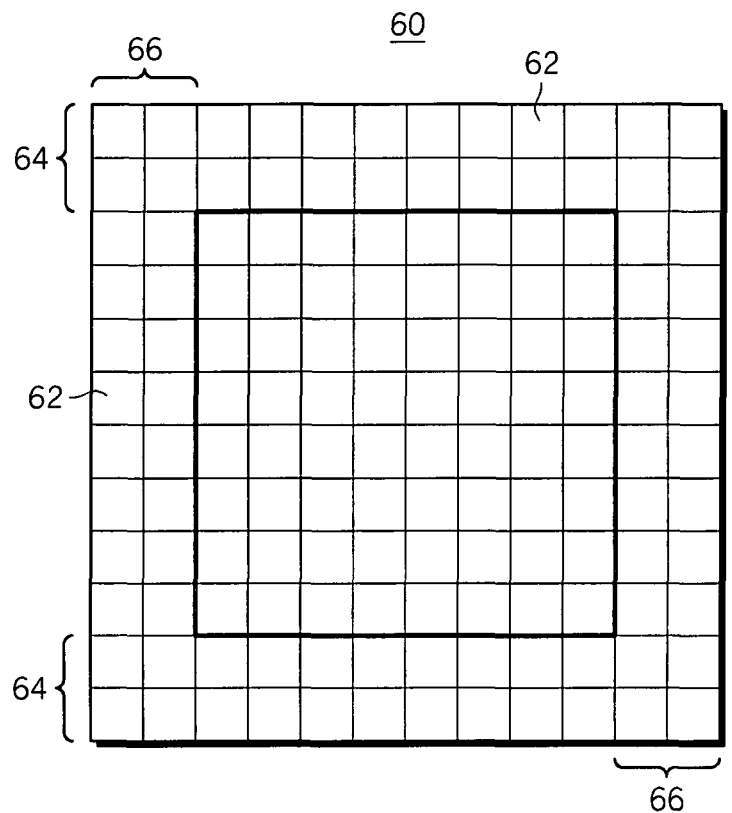
FIG. 6 is a diagram of the matrix of coefficients shown in FIG. 5, with embedded watermarking information or end-user access information.
FIG. 7 is a block diagram of a multimedia content image, showing peripheral pixel blocks and non-peripheral pixel blocks.

In addition to embedding blocks with watermark information and/or end-user access information based on the values of the representative coefficients within the blocks, the encoder 12 and the embedding step 48 also can embed portions of the watermark information and/or end-user access information across multiple pixel blocks within all or a portion of the multimedia content blocks. For example, as shown in FIG. 6, a first watermark ("A") is embedded across 6 adjacent coefficients in a pixel block and a second watermark ("B") is embedded across 5 adjacent coefficients within this pixel block. For longer watermarks requiring more information bits, the watermark can be distributed across multiple pixel blocks, e.g., pixel blocks 64 or 66 in FIG. 7.

Depending on how much watermark information and/or end-user access information is being embedded, the watermark information and/or end-user access information can be divided into an appropriate number of portions and embedded within a corresponding number of different pixel blocks within the multimedia content image. Thus, rather than embedding all of the watermark information and/or end-user access information in a single pixel block, which may require a relatively significant number of coefficients within the pixel block to be replaced with watermark information and/or end-user access information, a first portion of watermark information and/or end-user access information is embedded in a first pixel block, a second portion of watermark information and/or end-user access information is embedded in a second (different) pixel block, and so on until all portions of the watermark information and/or end-user access information are embedded within the image.

As an example, approximately 10 to 20 coefficients are replaced within each of a number, N, of pixel blocks within a given image. In this manner, assuming each DCT coefficient is 8 bits long, a watermark code of 10×N to 20×N bits long can be embedded into a given image. Embedding watermark information and/or end-user access information in this manner allows a much larger or longer watermark code to be embedded with an image without replacing a relatively large number of coefficients per pixel block, e.g., greater than 20 coefficients per pixel block. In this manner, the number of DCT coefficients replaced with watermark information and/or end-user access information per pixel block is reduced, compared to conventional methods. Accordingly, the visible effect of embedding watermark information and/or end-user access information into the multimedia content is reduced, compared to conventional embedding methods.

It should be understood that the pixel blocks into which various portions of watermark information and/or end-user access information is embedded do not have to be adjacent to one another or even in relatively close proximity to one another. However, at least for purposes of reading out and decoding the watermark information and/or end-user access information, the specific pixel block locations of the watermark code portions and the particular concatenation order must be known and made available to the appropriate decoding entity, e.g., as discussed hereinabove.

Another manner in which the embedding step 48 can embed watermark information and/or end-user access information into multimedia content is by embedding the watermark information and/or end-user access information into pixel blocks that are located in the peripheral areas of the image. Referring now to FIG. 7, shown is a block diagram of a multimedia content image 60. The image 60 is shown as a matrix of pixel blocks 62, e.g., a 12 (horizontal) by 12 (vertical) matrix of pixel blocks 62. Each pixel block 62 typically includes an 8×8 array of pixels. Thus, the image 60 is shown as having a width×height (W×H) pixel dimension of 96×96 (12×8 pixel width by 12×8 pixel height). However, it should be understood that multimedia content images can have any suitable pixel array dimensions, e.g., depending on the coding format used to code the images. For example, some typical image W×H pixel dimensions include 720×480 (90×60 pixel blocks), 640×480 (80×60 pixel blocks), 1280×720 (160×90 pixel blocks) and 1920×1080 (240×135 pixel blocks).

The embedding step 48 can include embedding watermark information and/or end-user access information into pixel blocks that are located in the peripheral areas of the image 60.

For example, the image 60 can include peripheral pixel blocks, e.g., the pixel blocks located in the outermost rows and columns of the image 60, and non-peripheral pixel blocks, e.g., the remaining pixel blocks, which generally are the pixels located inside of or within the peripheral pixel blocks. As an example, in FIG. 7, peripheral pixel blocks are indicated generally as those pixel blocks within the two outermost rows 64 and the two outermost columns 66.

The embedding step 48 can include embedding watermark information and/or end-user access information in one (or more) of the peripheral pixel blocks. In general, within the set of images that comprise the multimedia content, the peripheral pixel block areas of the images are not focused upon by a viewer as much as the non-peripheral pixel block areas, i.e., a viewer usually focuses most of their viewing attention on the central portion of the image, i.e., the non-peripheral pixel block areas. Accordingly, embedding watermark information and/or end-user access information into one or more peripheral pixel blocks effectively reduces the overall visible effect of embedding watermark information and/or end-user access information into the multimedia content, compared to conventional embedding methods.

Yet another manner in which the embedding step 48 can embed watermark information and/or end-user access information into multimedia content is by embedding watermark information and/or end-user access information into different locations from image to image. That is, the embedding step 48 can move or vary the location of the embedded watermark information and/or end-user access information among several different pixel blocks from one set of images to another set of images. In this manner, the embedding step 48 reduces the duration of any distortion or other adverse effect of embedded watermark information and/or end-user access information in any one area of the images.

For example, for a first set of images, e.g., the first 10% of the images selected to include watermark information and/or end-user access information therein, watermark information and/or end-user access information is embedded in a first location within the image set, such as within a first pixel block. For another set of images, e.g., the next 20% of the images selected to include watermark information and/or end-user access information therein, watermark information and/or end-user access information is embedded in a second (different) location within the image set, such as within a second pixel block. In this manner, watermark information and/or end-user access information can be embedded in several different pixel block locations from one image or set of images to another image or set of images. Thus, the watermark information and/or end-user access information is not embedded in one particular location for all images. By moving or varying the location of the embedded watermark information and/or end-user access information throughout the images, the embedding step 48 effectively reduces the overall visible effect of embedding watermark information and/or end-user access information into the multimedia content, compared to embedding methods that embed watermark information and/or end-user access information in the same image location.

It should be understood that any one or more of the embedding techniques described hereinabove can be combined to embed watermark information and/or end-user access information into multimedia content. For example, in addition to dividing watermark information and/or end-user access information into a plurality of portions and embedding the portions across several pixel blocks within an image, the information portions also can be embedded in peripheral pixel blocks and/or in different pixel block locations across images. Alternatively, for example, an entire watermark code can be embedded in peripheral pixel blocks and in different pixel block locations across images.

Regardless of which one or more of the various embedding techniques are used to embed watermark information and/or end-user access information into multimedia content, the overall visible effect of embedding watermark information and/or end-user access information into the multimedia content is reduced compared to conventional embedding methods.

The method 40 also can include a step 56 of transmitting the multimedia content to one or more end user devices 14, e.g., via the network 16. The multimedia content can be transmitted to the end user device 14 in any suitable manner. For example, the multimedia content can be transmitted via an appropriate wired connection, such as a broadcast channel, between the network 16 and one or more end user device 14. Alternatively, the multimedia content can be transmitted wirelessly between the network 16 and one or more of the end user device 14.

The method 40 also can include a step 58 of decoding the multimedia content. As discussed hereinabove, the end user device 14 receiving multimedia content typically includes a decoder (e.g., the decoder 24) configured to decompress and/or decode the received multimedia content in a manner that makes the multimedia content suitable for display, playback and/or other processing. As part of the decoding step 58, the decoder 24 and/or other suitable component or components decodes or reads out the embedded information from the multimedia content. For watermark information and/or end-user access information embedded in a manner that embeds a first portion of the information in one pixel block location and at least one second portion of the information in at least one second pixel block location, the various portions of the embedded information are read out and concatenated to produce the code of watermark information and/or end-user access information.

The watermark information and/or end-user access information typically is read from the multimedia content prior to any inverse transformation of the multimedia content being performed. Thus, for watermark information and/or end-user access information that was embedded in multimedia content by replacing one or more DCT coefficients, the watermark information and/or end-user access information is read out from among the DCT coefficients prior to performing any inverse DCT transform using the DCT coefficients. Such inverse DCT transform typically is required to decode the multimedia content, e.g., for display or other consumption by the end user device 14.

In general, the controller 22, the decoder 24 and/or other suitable components within the end user device 14 are suitably configured to look for particular embedded information (i.e., particular watermark codes and/or end-user access information codes) and/or to look for watermark information and/or end-user access information in particular pixel block locations and particular transform coefficient locations. The particular codes and/or information locations are made available to the end user device 14 and the decoder 24 in any suitable manner. For example, as discussed hereinabove, certain watermark and/or end-user access information indicia can be included within the coefficients themselves, such as block and coefficient flags, and start and end coefficients.

Alternatively, such information can be made available to the end user device 14 in the form of control information and/or a look-up table, generated by the encoder 12, that can be loaded into the end user device 14, e.g., upon initial power up or, alternatively, as part of a subsequent transmission to the end user device 14. Also, alternatively, such information can be pre-loaded or otherwise stored within the end user device 14 before its initial operation.

If watermark information and/or end-user access information is included within a given block, the controller 22 will allow decoding of the particular block. However, if watermark information and/or end-user access information is not included within a given block, the controller 22 stops decoding the particular block.

Figure 8:
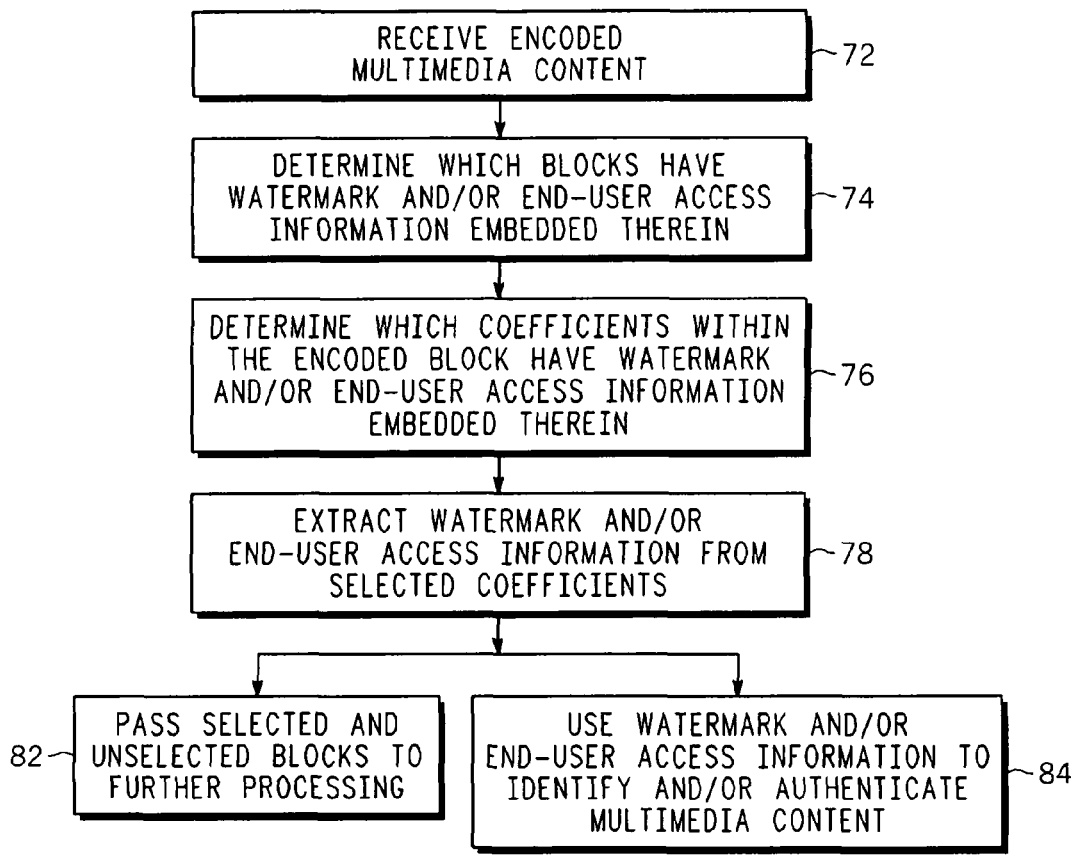
FIG. 8 is a block diagram of a method for decoding multimedia content including watermarking information.
Figure 9:
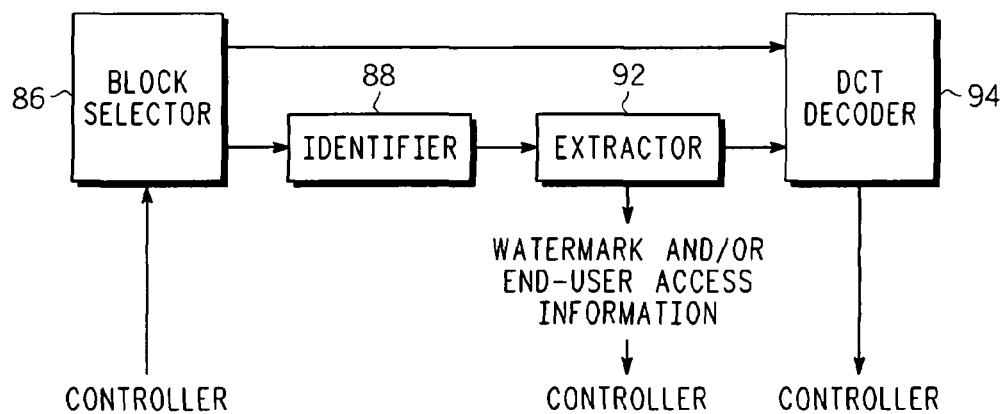
FIG. 9 is a block diagram of the decoder used in the end user device of FIG. 1.

Referring now to FIG. 8, shown is a flow chart of the decoding step 58 used in the method 40 of FIG. 3. Also, referring to FIG. 9, with continuing reference to FIG. 8, shown is a block diagram of the decoder 24 used in the end user device 14 of FIG. 1. The decoder 24 includes a block selector 86, a watermark information and/or end-user access information identifier 88, a watermark information and/or end-user access information extractor 92, and a multimedia content decoder 94, such as a DCT decoder. The operation of the decoder 24 will be discussed hereinbelow as part of the discussion of the decoding step 58 shown in FIG. 8.

One or more of the components in the decoder 24, including one or more of the block selector 86, the identifier 88, the extractor 92 and the multimedia content decoder 94, can be comprised partially or completely of any suitable structure or arrangement, e.g., one or more integrated circuits. Also, it should be understood that the decoder 24 includes other components, hardware and software (not shown) that are used for the operation of other features and functions of the decoder 24 not specifically described herein.

The decoder 24 can be partially or completely configured in the form of hardware circuitry and/or other hardware components within a larger device or group of components. Alternatively, the decoder 24 can be partially or completely configured in the form of software, e.g., as processing instructions and/or one or more sets of logic or computer code. In such configuration, the logic or processing instructions typically are stored in a data storage device (not shown). The data storage device typically is coupled to a processor or controller (e.g., the controller 22 shown in FIG. 1), which accesses the necessary instructions from the data storage element and executes the instructions or transfers the instructions to the appropriate location within the decoder 24.

As shown in FIG. 8, the decoding step 58 includes a step 72 of receiving encoded multimedia content. At least a portion of the encoded multimedia content received by the end user device 14 is transmitted or transferred from the controller 22 to the decoder 24. As discussed hereinabove, at least a portion of the encoded multimedia content typically is in the form of a plurality of blocks each represented by a plurality of coefficients, such as DCT coefficients.

The encoded multimedia content transferred from the controller 22 to the decoder 24 is received by the block selector 86. The decoding step 58 includes another step 74 of determining or identifying which blocks are embedded with watermark information and/or end-user access information. The block selector 86 performs such determination or identification.

The block selector 86 identifies blocks embedded with watermark information and/or end-user access information in a suitable manner, depending on the manner in which the blocks were selected for embedding by the block selector 36 in the encoder 12. For example, the block selector 86 can look for watermark information and/or end-user access information in block locations where coefficients should be zero or close to zero, i.e., based on coefficient values and/or their particular locations within a given block. As discussed hereinabove, the blocks selected for embedding with watermark information and/or end-user access information can be marked, flagged or otherwise identified. Accordingly, the block selector 86 is configured to identify the embedded blocks based on the particular manner in which the embedded blocks were selected.

Alternatively, the block selector 86 can include or receive appropriate identification information and/or other appropriate information associated with the received blocks that allows the block selector 86 to determine which blocks have been embedded with watermark information and/or end-user access information and in what manner the particular blocks have been embedded with such information, e.g., completely or partially. For example, in accordance with a previous example hereinabove, such information can indicate that every block with a particular digital value in a particular pixel block location has watermark information and/or end-user access information embedded therein.

Blocks that are not identified by the block selector 86 as blocks embedded with watermark information and/or end-user access information can be passed directly from the block selector 86 to the multimedia content decoder 94. Blocks that are identified by the block selector 86 as blocks embedded with watermark information and/or end-user access information are passed to the identifier or coefficient identifier 88. Alternatively, all blocks, i.e., embedded blocks and non-embedded blocks, can be marked accordingly by the block selector 86 and passed through to the coefficient identifier 88. In such case, the coefficient identifier 88 can be configured to identify which blocks have been identified as embedded blocks and which blocks have not been identified as embedded blocks.

The decoding step 58 includes another step 76 of determining or identifying which coefficients within the identified blocks are embedded with watermark information and/or end-user access information. Once the embedded blocks have been identified, the blocks are passed to the coefficient identifier 88. The coefficient identifier 88 is configured to determine which of the coefficients within an identified block are embedded with watermark information and/or end-user access information. The coefficient identifier 88 can identify coefficients embedded with watermark information and/or end-user access information in any suitable manner. For example, the coefficient identifier 88 can include or receive appropriate identification information and/or other appropriate information that allows the coefficient identifier 88 to identify coefficients embedded with watermark information and/or end-user access information. For example, the coefficient identifier 88 can be dynamically configured to look for particular watermark information and/or end-user access information values within the coefficients of selected or identified blocks. Alternatively, the coefficient identifier 88 can be dynamically configured to look at particular coefficients within selected blocks and/or particular portions of a given coefficient (i.e., particular bit locations) for watermark information and/or end-user access information. Such includes being dynamically configured to look at and/or within various coefficients for particular start and stop codes, which indicate the beginning and end or a string of coefficients that include watermark information and/or end-user access information, e.g., as discussed in a previous example hereinabove. The manner in which the coefficient identifier 88 identifies watermark information and/or end-user access information depends on the manner in which the particular coefficients were embedded with watermark information and/or end-user access information by the encoder 12. However, because watermark information and/or end-user access information has been embedded dynamically, the coefficient identifier 88 has to receive and/or be equipped with appropriate information that allows the coefficient identifier 88 to identify coefficients embedded with watermark information and/or end-user access information.

The decoding step 58 includes another step 78 of extracting watermark information and/or end-user access information from selected or identified coefficients. Once the embedded coefficients of the selected blocks have been identified, the blocks are passed to the extractor 92. The extractor 92 is configured to remove or extract the watermark information and/or end-user access information from the coefficients identified by the identifier 88 as having watermark information and/or end-user access information embedded therein. The extractor 92 is configured to extract watermark information and/or end-user access information from identified coefficients in any suitable manner, depending on the manner in which the coefficients were embedded with the watermark information and/or end-user access information.

For example, the extractor 92 can include or receive appropriate information regarding whether the identified coefficients are completely or partially embedded with watermark information and/or end-user access information. For coefficients that are completely embedded with watermark information and/or end-user access information, the extractor 92 can extract all of the information from the coefficient location. For coefficients that partially embedded with watermark information and/or end-user access information, the extractor 92 can remove just the portion of the coefficient that includes the watermark information and/or end-user access information. In such case, the extractor 92 includes or is provided with appropriate information that informs the extractor 92 which particular location or locations within the coefficient includes the watermark information and/or end-user access information. Alternatively, if the extractor 92 has been informed with the particular information the extractor 92 is to look for, the extractor 92 can analyze the entire coefficient for the particular information.

Upon extracting watermark information and/or end-user access information from a particular coefficient, the extractor 92 can leave the coefficient unchanged, i.e., leave the coefficient with the watermark information and/or end-user access information embedded therein. Alternatively, the extractor 92 can zero out the coefficient, i.e., replace the coefficient with a value of zero, or replace the coefficient value with a predetermined value. Alternatively, the extractor 92 can replace the coefficient with an interpolated value, e.g., based on the values or adjacent and/or nearby coefficients. The extractor 92 then passes the watermark information and/or end-user access information to the controller 22.

The decoding step 58 includes another step 82 of passing selected and non-selected blocks to further processing. Once the extractor 92 has extracted watermark information and/or end-user access information from the blocks selected by the block selector 86 and the coefficients identified by the identifier 88, the blocks are passed to further processing, such as to a multimedia content decoder, such as the DCT decoder 94. Also, the blocks not selected by the block selector 86 are passed to the DCT decoder 94 or other appropriate multimedia content decoder. The DCT decoder 94 transforms the block coefficients back into a plurality of blocks, or other form of multimedia content, suitable for use by the end user device 14. The DCT decoder 94 then passes the plurality of blocks back to the controller 22.

Once the embedded watermark information and/or end-user access information has been decoded and read out from the multimedia content, the watermark information and/or end-user access information can be used by the end user device 14 in an appropriate manner, e.g., to identify and/or authenticate, respectively, the corresponding multimedia content within which the information was embedded. The decoding step 58 includes another step 84 of using the watermark information and/or end-user access information to identify and/or authenticate, respectively, the underlying multimedia content or other multimedia content. For example, such identification and/or authentication can include comparing the decoded watermark information and/or end-user access information, respectively, to a reference code within a look-up table stored in or otherwise provided to the end user device 14, e.g., as just discussed hereinabove, or other suitable decoding location. It should be understood that the end user device 14 can identify and/or authenticate the multimedia content using the decoded watermark information and/or end-user access information, respectively, in any other suitable manner.

The processing involved in identifying and/or authenticating the multimedia content using the watermark information and/or end-user access information can be performed by the controller 22 or other suitable component or components within the end user device 14. Alternatively, such processing can be performed by a suitable component or components external to the end user device 14.

Typically, as part of the identification and/or authentication process, the controller 22 and/or other component may have to concatenate the extracted watermark information and/or end-user access information, respectively, to derive the appropriate watermark information and/or end-user access information. Such concatenation is likely especially in cases where portions of watermark information and/or end-user access information were embedded across multiple coefficients and/or across multiple blocks.

The methods shown in FIG. 3 and FIG. 8 described herein may be implemented in a general, multi-purpose or single purpose processor. Such a processor will execute instructions, either at the assembly, compiled or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the system, method and device for embedding watermark information into multimedia content herein described without departing from the spirit and scope of the invention as defined by the appended claims and their full scope of equivalents.

The methods described herein also can be implemented using one or more storage media, wherein the content stored thereon includes end-user access information.

What is claimed is:
1. A device for embedding multimedia content with additional information, comprising:
   an encoder configured to transform at least a portion of the multimedia content into a plurality of blocks represented by a plurality of coefficients;

a block selector coupled to the encoder and configured to select at least one block of the plurality of blocks to be embedded with additional information;

a coefficient selector coupled to the block selector and configured for selecting at least one coefficient within a selected block to be embedded with additional information; and an inserter coupled to the coefficient selector and configured to insert additional information into the selected coefficients of the selected blocks of the multimedia content, wherein the additional information includes a first portion of additional information and at least one second portion of additional information, and wherein the inserter inserts the first portion of additional information into at least a portion of a first selected coefficient within a selected block and inserts the at least one second portion of additional information into at least a portion of at least one second coefficient within the selected block; and wherein at least one of the block selector selects which blocks are to be embedded with additional information based on the values of the plurality of coefficients and the coefficient selector selects which coefficients within a selected block are to be embedded with additional information based on the values of the plurality of coefficients.

2. The device as recited in claim 1, wherein the plurality of blocks includes a first block that includes a first coefficient and at least one second coefficient and at least one second block that includes at least one third coefficient corresponding to the first coefficient of the first block and at least one fourth coefficient corresponding to the at least one second coefficient of the at least one first block, and wherein the inserter inserts additional information into at least a portion of the at least one first coefficient in the first block and at least a portion of the at least one fourth coefficient in the second block.

3. The device as recited in claim 1, wherein the additional information is watermark information.

4. The device as recited in claim 1, wherein the additional information is end-user access information.

5. A device for embedding multimedia content with additional information, comprising:
an encoder configured to transform at least a portion of the multimedia content into a plurality of blocks represented b a plurality of coefficients;

a block selector coupled to the encoder and configured to select at least one block of the plurality of blocks to be embedded with additional information;

a coefficient selector coupled to the block selector and configured for selecting at least one coefficient within a selected block to be embedded with additional information; and an inserter coupled to the coefficient selector and configured to insert additional information into the selected coefficients of the selected blocks of the multimedia content;

wherein at least one of the block selector selects which blocks are to be embedded with additional information based on the values of the plurality of coefficients and the coefficient selector selects which coefficients within a selected block are to be embedded with additional information based on the values of the plurality of coefficients, and wherein at least a portion of the multimedia content includes a peripheral portion represented by at least one peripheral block having at least one peripheral coefficient and a non-peripheral portion represented by at least one non-peripheral block having at least one non-peripheral coefficient, and wherein the inserter inserts additional information into at least a portion of the peripheral coefficients selected by the coefficient selector.

6. A device for embedding multimedia content with additional information, comprising:
an encoder configured to transform at least a portion of the multimedia content into a plurality of blocks represented by a plurality of coefficients;

a block selector coupled to the encoder and configured to select at least one block of the plurality of blocks to be embedded with additional information, wherein the block selector embeds at least one form of block identification indicia into the blocks selected by the block selector to be embedded with additional information;

a coefficient selector coupled to the block selector and configured for selecting at least one coefficient within a selected block to be embedded with additional information; and an inserter coupled to the coefficient selector and configured to insert additional information into the selected coefficients of the selected blocks of the multimedia content; and wherein at least one of the block selector selects which blocks are to be embedded with additional information based on the values of the plurality of coefficients and the coefficient selector selects which coefficients within a selected block are to be embedded with additional information based on the values of the plurality of coefficients.

7. A device for embedding multimedia content with additional information, comprising:
an encoder configured to transform at least a portion of the multimedia content into a plurality of blocks represented by a plurality of coefficients;

a block selector coupled to the encoder and configured to select at least one block of the plurality of blocks to be embedded with additional information;

a coefficient selector coupled to the block selector and configured for selecting at least one coefficient within a selected block to be embedded with additional information, wherein the coefficient selector embeds at least one form of identification indicia indicating which coefficients are to be embedded with additional information into the blocks selected by the block selector to be embedded with additional information;

an inserter coupled to the coefficient selector and configured to insert additional information into the selected coefficients of the selected blocks of the multimedia content; and wherein at least one of the block selector selects which blocks are to be embedded with additional information based on the values of the plurality of coefficients and the coefficient selector selects which coefficients within a selected block are to be embedded with additional information based on the values of the plurality of coefficients.

8. A method for embedding additional information into multimedia content, comprising the steps of:
transforming at least a portion of the multimedia content into images each having a plurality of pixel blocks represented by a plurality of coefficients;

reading the values of at least a portion of the plurality of coefficients; and embedding additional information into at least a portion of at least one of the plurality of coefficients, wherein the coefficients of a pixel block into which additional information is embedded are selected based on the values of the plurality of coefficients; and wherein the additional information includes a first portion of additional information and at least one second portion of additional information, and wherein the embedding step includes embedding the first portion of the additional information into at least a portion of a first pixel block of at least one image and embedding the second portion of the additional information into at least a portion of at least one second pixel block of the at least one image.

9. The method as recited in claim 8, wherein the embedding step embeds additional information into at least a portion of a first pixel block within at least one image and additional information into at least a portion of at least one second pixel block within the at least one image.

10. The method as recited in claim 8, wherein the plurality of images includes a first image including at least one first pixel block and at least one second pixel block and at least one second image including at least one third pixel block corresponding to the first pixel block of the first image and at least one fourth pixel block corresponding to the at least one second pixel block of the at least one first image, and wherein the embedding step includes embedding additional information into at least a portion of the at least one first pixel block in the first image and at least a portion of the at least one fourth pixel block in the second image.

11. The method as recited in claim 8, wherein the additional information is watermark information.

12. The method as recited in claim 8, wherein the additional information is end-user access information.

13. A method for embedding additional information into multimedia content, comprising the steps of:

transforming at least a portion of the multimedia content into images each having a plurality of pixel blocks represented by a plurality of coefficients;

reading the values of at least a portion of the plurality of coefficients; and embedding additional information into at least a portion of at least one of the plurality of coefficients, wherein the coefficients of a pixel block into which additional information is embedded are selected based on the values of the plurality of coefficients; and wherein the pixel blocks include peripheral pixel blocks and non-peripheral pixel blocks, and wherein the embedding step includes embedding additional information into at least a portion of the peripheral pixel blocks.

14. A method for embedding additional information into multimedia content, comprising the steps of:

transforming at least a portion of the multimedia content into images each having a plurality of pixel blocks represented by a plurality of coefficients;

reading the values of at least a portion of the plurality of coefficients; and embedding additional information into at least a portion of at least one of the plurality of coefficients, wherein the coefficients of a pixel block into which additional information is embedded are selected based on the values of the plurality of coefficients; and further comprising the step of embedding at least one form of identification indicia into at least a portion of at least one of the plurality of coefficients to indicate which coefficients are to be embedded with additional information.

15. An end user device for processing multimedia content, comprising:

a controller configured to receive multimedia content, including multimedia content having additional information embedded therein, wherein the received multimedia content includes a plurality of blocks represented by a plurality of coefficients, including coefficients having additional information embedded therein, wherein the coefficients into which additional information is embedded is based on the values of the plurality of coefficients, and wherein the multimedia content includes at least one form of identification indicia that identifies which blocks are represented by coefficients that include additional information embedded therein and which coefficients have additional information embedded therein; and a decoder coupled to the controller for reading additional information embedded in the multimedia content, wherein the decoder includes a block selector configured to determine which of the plurality of blocks includes at least one coefficient embedded with additional information, wherein the block selector is configured to determine which of the plurality of blocks includes at least one coefficient embedded with additional information based on whether a block includes identification indicia, an identifier coupled to the block selector and configured to identify which coefficients within a selected block are embedded with additional information, wherein the identifier is configured to determine which of the coefficients are embedded with additional information based on identification indicia included in the selected block, an extractor coupled to the identifier and configured to extract additional information from the coefficient identified as having additional information embedded therein, and a multimedia content decoder coupled to the extractor and configured to transform blocks received thereby into multimedia content, wherein the controller is configured to receive additional information from the extractor and configured to process at least a portion of the multimedia content received by the end user device based on the additional information received from the extractor.

16. The device as recited in claim 15, wherein the multimedia content includes control information indicating which blocks of the plurality of blocks include coefficients having additional information embedded therein, and wherein the block selector determines which of the plurality of blocks includes at least one coefficient embedded with additional information based on the control information.

17. The device as recited in claim 15, wherein the multimedia content includes control information indicating which coefficients within a given block include additional information embedded therein, and wherein the identifier determines which coefficients include additional information embedded therein based on the control information.

18. The device as recited in claim 15, wherein at least a portion of the selected blocks are marked, and wherein the block selector determines which of the plurality of blocks includes at least one coefficient embedded with additional information based on whether the block is marked.

19. The device as recited in claim 15, wherein at least a portion of the selected blocks includes identification information identifying which coefficients within the block include additional information embedded therein, and wherein the identifier determines which coefficients within a selected block are embedded with additional information based on the identification information.

20. The device as recited in claim 15, wherein the controller is configured to concatenate at least a portion of the additional information received from the extractor, and wherein the controller is configured to authenticate at least a portion of the multimedia content received by the end user device based on the concatenated additional information.

21. The device as recited in claim 15, wherein the extractor is configured to replace a coefficient from which additional information has been extracted with an interpolated coefficient value, wherein the interpolated coefficient value is based on values of coefficients adjacent to the coefficient from which the additional information has been extracted.

22. The device as recited in claim 15, wherein the additional information is watermark information.

23. The device as recited in claim 15, wherein the additional information is end-user access information.

* * * * *